(12) United States Patent
Gottis

(10) Patent No.: US 6,433,084 B1
(45) Date of Patent: *Aug. 13, 2002

(54) POWDER COATING

(75) Inventor: Philippe-Guilhaume Gottis, Mulhouse (FR)

(73) Assignee: Vantico Inc., Brewster, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,572

(22) Filed: Apr. 23, 1999

Related U.S. Application Data

(63) Continuation-in-part of application No. 08/733,289, filed on Oct. 17, 1996, now abandoned.

(51) Int. Cl.$^7$ .............................................. C08L 33/02
(52) U.S. Cl. ...................................... 525/119; 525/934
(58) Field of Search ................................ 525/119, 934

(56) References Cited

U.S. PATENT DOCUMENTS

| | | | |
|---|---|---|---|
| 3,444,237 A | 5/1969 | Jaffe | 260/468 |
| 3,859,314 A | 1/1975 | Dukes et al. | 260/348.6 |
| 4,255,553 A | * 3/1981 | Mizumura et al. | 525/119 |
| 5,294,683 A | * 3/1994 | Cotting et al. | 525/524 |
| 5,322,907 A | 6/1994 | Cotting et al. | 525/438 |
| 5,525,685 A | 6/1996 | Renner et al. | 525/510 |

FOREIGN PATENT DOCUMENTS

| | | |
|---|---|---|
| DE | 2319815 | 11/1973 |
| EP | 0462053 | 12/1991 |
| EP | 0506617 | 9/1992 |
| EP | 0536085 | 4/1993 |
| EP | 0697440 | 2/1996 |
| GB | 1333361 | 10/1973 |
| GB | 1409835 | 10/1975 |
| GB | 1542709 | 3/1979 |
| JP | 53-140395 | * 12/1978 |
| JP | 1542709 | * 3/1979 |

OTHER PUBLICATIONS

Chem. Abstr. 90(26):205989j for JP 53140395, Jul. 1978.
Data Sheet SCX–819, 1995.

* cited by examiner

*Primary Examiner*—Robert E. L. Sellers
(74) *Attorney, Agent, or Firm*—James H. Shalek, Esq.; Kristin H. Neuman, Esq.; Charles M. Doyle, Esq.

(57) ABSTRACT

The present invention relates to a powder coating composition containing as binder one or more than one poly(meth)acrylic resin having free carboxyl groups and, as hardener for these poly(meth)acrylic resins, one or more than one epoxy resin having a molecular weight of up to 1500, wherein the epoxy resins comprise at least 70% by weight of glycidyl esters which are selected from the group consisting of aliphatic and cycloaliphatic polyglycidyl polycarboxylates. More particularly, the present invention relates to a coating composition, which is free of carboxyl-functional polyesters, comprising a binder consisting of one or more than one poly(meth)acrylic resin having free carboxyl groups and, as hardener for the poly(meth)acrylic resin, one or more than one epoxy resin having a molecular weight of up to 1500, wherein the epoxy resin is a cycloaliphatic polyglycidyl polycarboxylate or mixtures thereof.

5 Claims, No Drawings

POWDER COATING

This application is a continuation-in-part of application Ser. No. 08/733,289, abandoned filed Oct. 17, 1996.

The present invention relates to powder coating compositions based on solid poly(meth)acrylic resins having free carboxyl groups, i.e. on resins which are obtainable by polymerisation of monomers which contain acrylic monomers and/or methacrylic monomers, as well as to the use thereof as automotive lacquers.

Powder coating compositions based on poly(meth)acrylic resins are used whenever powder coating compositions of such high fastness to weathering and hardness are desired as cannot be achieved with other binder systems customarily used for powder coatings, such as polyesters. Poly(meth)acrylic resins containing specific solid carboxyl groups are, for example, sold commercially as binders for powder coatings which are intended especially for cures with triglycidyl isocyanurate and which give powder coatings having the cited properties (Johnson Wax Speciality Chemicals Product Application Bulletin, Powder Coatings). However, these powder coatings can only be used at temperatures above 160° C. because they have only very bad flow at temperatures lower than that, resulting in a pronounced orange peel effect. In spite of good fastness to weathering they are therefore e.g. not suitable for the preparation of automotive lacquers as in this case the coating composition is required to harden at a temperature of at maximum 140–150° C. in order not to adversely affect the coats of base lacquer during the hardening of the finishing coating composition coated thereon.

This invention provides a solution for the problem described above by providing special powder coatings based on poly(meth)acrylic resins which harden quickly and completely already at a temperature of 140–150° C. and which have good flow properties even at these relatively low temperatures as well as good fastness to weathering. This is achieved by using epoxy resins having a molecular weight of below 1500 as hardeners for powder coatings based on poly(meth)acrylic resins having free carboxyl groups, the epoxy resins containing at least 70% by weight of aliphatic and/or cycloaliphatic polyglycidyl polycarboxylates.

Accordingly, the invention relates to a powder coating composition comprising as binder one or more than one poly(meth)acrylic resin having free carboxyl groups and, as hardeners for these poly(meth)acrylic resins, one or more than one epoxy resin having a molecular weight of up to 1500, in which powder coating composition the epoxy resins contain at least 70% by weight of glycidyl esters which are selected from the group consisting of aliphatic and cycloaliphatic polyglycidyl polycarboxylates. More particularly, the instant invention relates to an improved coating composition, which is free of carboxyl-functional polyesters, comprising a binder consisting of one or more than one poly(meth)acrylic resin having free carboxyl groups and, as hardener for the poly(meth)acrylic resin, one or more than one epoxy resin having a molecular weight of up to 1500, wherein the epoxy resin is a diglycidyl ester of a cycloaliphatic polyglycidyl polycarboxylate or mixtures thereof, the cycloaliphatic polyglycidyl polycarboxylate being selected from the group consisting of diglycidyl hexahydrophthalate, diglycidyl hexahydroisophthalate, diglycidyl hexahydroterephthalate, diglycidyl methylhexahydrophthalate, diglycidyl 2,5-dimethylhexahydrophthalate, diglycidyl N endomethylenehexahydrophthalate, diglycidyl 1,8-decalindicarboxylates, diglycidyl 2,3-decalindicarboxylates, diglycidyl 2,6-decalindicarboxylates, triglycidyl cyclohexanetricarboxylates, tetraglycidyl hexahydromellophanate and tetraglycidyl hexahydropyrromellitate.

In addition to their excellent flow properties, the powder coating compositions according to this invention also have good storability at room temperature or at moderately elevated temperatures, such as in the temperature range from 10 to 40° C., and accordingly they also have a good reactivity/stability ratio.

Another advantage achieved in accordance with the present invention is that the powder coating compositions cure, preferably at temperatures in the range of about 100° C. to about 150° C., to a smooth form. The smoothness of coating surfaces can for example be objectively measured using the "Wave Scan" profilometer of Byk-Gardner, which is a commercially available portable flow measuring instrument for characterizing "orange peel" by optically scanning the brightness pattern reflected from a surface when it is irradiated with light emitted from a laser diode. The Byk-Gardner catalogue describing the profilometer is incorporated herein by reference,. The profilometer that is disclosed in U.S. Pat. No. 5,596,412, incorporated herein by reference, provides different measurement parameters, i.e., the parameter "Long-Wave" and "Subnote" being in particular indicative of the surface roughness and flow properties of the coating systems. A parameter "Long-Wave" of less than 50 and a parameter "Subnote" of less than 120 measured for a coating derived from a coating composition is, for the purpose of the instant invention, considered to be a sufficiently smooth surface and accordingly of good flow properties shown by said composition. The powder coating compositions according to the instant invention provide such smooth coatings having a parameter "Long-Wave" of less than 50, preferably less than 45, and a parameter "Subnote" of less than 120, preferably less than 100, even when cured at a temperature of below 160° C., in particular at a temperature of about 100° to about 150° C.

Poly(meth)acrylic resins having free carboxyl groups can be obtained by copolymerisation of acrylic monomers and/or methacrylic monomers, such as $C_1$–$C_{12}$alkyl(meth)acrylates, typically methyl(meth)acrylates, ethyl(meth)acrylates, propyl(meth)acrylates, butyl(meth)acrylates, pentyl(meth)acrylates, hexyl(meth)acrylates, octyl(meth)acrylates, 2-ethylhexyl(meth)acrylates, decyl(meth)acrylates and dodecyl(meth)acrylates, $C_1$–$C_4$alkyl(meth)acrylates being preferred, or (meth)acrylamide with acrylic acid and/or methacrylic acid and, optionally, other additional ethylenically unsaturated comonomers, typically vinylaromatics, e.g. styrene, α-methylstyrene, vinyltoluene or also β-halogenated styrenes. This copolymerisation can be carried out according to known methods, for example by dissolving the monomers in suitable organic solvents and thermally reacting them in the presence of a suitable initiator which is soluble in the solvent, such as dicumyl peroxide, as well as in the presence of a suitable chain transfer reactant such as thioglycolic acid (solution polymerisabon), or by suspending and polymerising the monomer mixture together with a solution of the initiator in an organic solvent in water, or also by emulsifying the monomer mixture using surfactants, e.g. sodium lauryl sulfate in water and reacting it in the presence of a water-soluble polymerisation initiator, such as $K_2S_2O_8$ (emulsion polymerisation). The ready poly (meth)acrylic resin is then isolated in solid form from the solvent or water. The reaction can also be carried out without using solvents or water, for example in accordance with JP-A-Sho 53-140395. Suitable poly(meth)acrylic resins are solid in the temperature range from room temperature (15 to 25° C.). They usually have a molecular weight from 1000 to 50000 (medium weight $M_w$), preferably from 5000 to 20000. The Tg value (glass transition temperature) of the poly (meth)acrylic resins, determined by DSC (heating rate: 10° C./minute), is preferably from 40 to 75° C. The acid number of the resins, indicated in mg equivalents of KOH per g of poly(meth)acrylic resin, is preferably from 30 to 160, more preferably from 35 to 80.

The aliphatic polyglycidyl polycarboxylates are preferably the aliphatic polyglycidyl polycarboxylates containing 2 to 50, particularly preferably 2 to 20, carbon atoms which may, in addition to the carboxyl groups, also contain other functional groups. Typical examples of suitable aliphatic polycarboxylic acids are oxalic acids, malonic acid, succinic acid, glutaric acid, adipic acid, pimelic acid, subaric acid, azelaic acid or sebacic acid. Hardeners which are also suitable for the purposes of this invention are aliphatic polyglycidyl esters of formula (I) given below, wherein $X_1$, $X_2$, $X_3$, $X_4$, $X_5$ and $X_6$ are each independently of one another a hydrogen atom, a $C_1$–$C_4$alkyl group or a group of formula (II) given below, and A in formula (II) is an alkylene group containing 2 to 4 carbon atoms, preferably an ethylene group, and Y is a hydrogen atom or a methyl group:

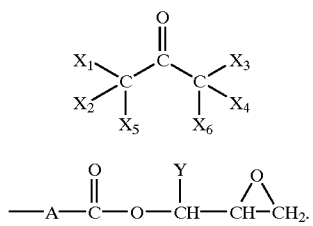

(I)

(II)

Polyglycidyl esters of formula (I) are disclosed, inter alia, in EP-A-0 506 617. Specific examples are glycidyl acetone-1,1,3,3-tetrapropionate and glycidyl pentanone-(3)-2,2,4,4-tetrapropionate.

Preferred aliphatic polyglycidyl polycarboxylates are diglycidyl oxalate, diglycidyl succinate, diglycidyl adipate, diglycidyl sebacate, diglycidyl azelate.

Within this description, cycloaliphatic polyglycidyl polycarboxylates are generally understood to mean polyglycidyl polycarboxylates based on a carbon backbone containing one or more than one cycloaliphatic ring and which is free from C—C multiple bonds or of aromatic groups. The individual cycloaliphatic rings can contain one or more than one substituent, typically $C_1$–$C_6$alkyl, chloro, bromo or hydroxyl substituents and preferably contain 5 to 10 carbon atoms. If the polycarboxylic acid contains two or more cycloaliphatic rings, then these may be fused or linked via suitable atom groups, in particular via straight-chain or branched aliphatic groups of valency 2–6 having e.g. 1 to 30 carbon atoms which may also contain one or more than one hetero atom, typically a sulfur atom, nitrogen atom or, preferably, oxygen atom, as well as substituents, such as chloro, bromo or hydroxyl substituents. Typical examples of such linking groups are those of formula —CH₂—, —C(CH₃)₂—, >CH—, >C(CH₃)—, >C< or

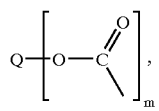

wherein Q is an organic radical of valency 2–6 containing preferably 2 to 15 carbon atoms which is free from C—C double bonds. Specific examples of cycloaliphatic polyglycidyl polycarboxylates which are suitable according to this invention are diglycidyl hexahydro-phthalate, diglycidyl hexahydroisophthalate, diglycidyl hexahydroterephthalate, diglycidyl methylhexahydrophthalate, diglycidyl 2,5-dimethylhexahydrophthalate, diglycidyl endomethylenehexahydrophthalate, diglycidyl 1,8-, 2,3- and 2,6-decalindicarboxylates, triglycidyl cyclohexanetricarboxylates, such as triglycidyl hexahydro-hemimellitate or, preferably, triglycidyl hexahydrotrimesate as well as triglycidyl hexahydrotrimellitate, tetraglycidyl hexahydromellophanate (cyclohexane-1,2,3,4-tetracarboxylic acid) or tetraglycidyl hexahydro-pyrromellitate (cyclohexane-1,2,4,5-tetracarboxylic acid). Polyglycidyl cydohexanepolycarboxylates, such as triglycidyl 1,2,4 or 1,3,5-cyclohexanetricarboxylates, can, for example, also be obtained in conventional manner from the corresponding cyclohexanepolycarboxylic acids by reaction with epichlorohydrin. Where not commercially available, the cyclohexanepolycarboxylic acids can, for example, be prepared by hydration of the corresponding benzenepolycarboxylic acids in accordance with U.S. Pat. No. 3,444,237.

The cycioaliphatic polyglycidyl esters disclosed in DE-A-23 19 815 and EP-A-0 506 617 are also well suited for the powder coatings of this invention. These have the formula (III) given below, wherein n is an integer from 2 to 9, preferably from 2 to 3, and $X_1$, $X_2$, $X_3$ and $X_4$ are each independently of one another a hydrogen atom, a $C_1$–$C_4$alkyl group or a group of the above-mentioned formula (II):

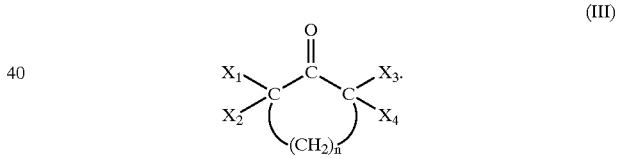

(III)

Illustrative examples of this type of compounds are cyclopentanone-2,2,5,5-tetra(propionic acid glycidyl ester), cydohexanone-2,2,6,6-tetra(propionic acid glycidyl ester) or cyclopentanone-2,2-di(propionic acid glycidyl ester).

Other cycioaliphatic polyglycidyl esters suitable for this invention are the diglycidyl esters of the formula given below, which are also disclosed in EP-A-0 506 607, wherein $X_7$ is an aliphatic or cycloaliphatic polyglycidyl ester of valency m containing 2 to 30 carbon atoms, the carbon chain of which may be interrupted by one or more than one hetero atom, typically a nitrogen atom, sulfur atom or, preferably, oxygen atom and which is unsubstituted or substituted and can contain in particular hydroxyl, chloro or bromo substituents, and wherein m is an integer from 2 to 6, and $X_8$ and $X_9$ are each independently of the other a hydrogen, chloro or bromo atom, a $C_1$–$C_4$alkyl group, or one of $X_8$ or $X_9$ is a group of the formula (V) given below, the other having one of the meanings stated above:

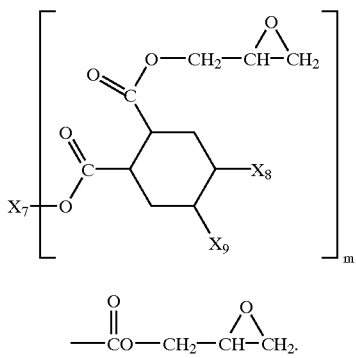

(IV)

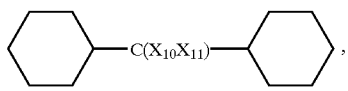

(V)

$X_7$ is preferably a di- to quadrivalent radical which is derived from an aliphatic polyalcohol containing 2 to 10 carbon atoms, which may be oligomerised, typically from glycol, glycerol, trimethylolpropane or bis(trimethylolpropane), or from polyether polyols by removal of 2 to 4 hydroxyl groups, or is a di- to quadrivalent, preferably divalent, group having the following molecular structure

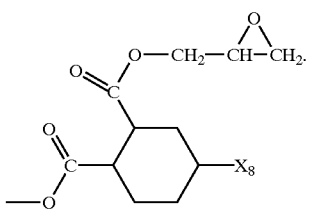

wherein $X_{10}$ and $X_{11}$ are each independently of the other a hydrogen atom, a $C_1$–$C_4$alkyl group or a cyclohexyl group. $X_{10}$ and $X_{11}$ are particularly preferably either a hydrogen atom or a methyl group. Particularly preferred compounds of this structure have the formulae (G—CH$_2$)$_3$C—C$_2$H$_5$, (G—CH$_2$)$_2$C(C$_2$H$_5$)—CH$_2$—O—CH$_2$—(C$_2$H$_5$)C(CH$_2$—G)$_2$, (G—CH$_2$)$_2$CH(OH) as well as G—(C$_6$H$_4$)—C(CH$_3$)$_2$—(C$_6$H$_4$)—G, wherein G corresponds in each case to a group of formula (VI) and $X_8$ is either a hydrogen atom or a group of the above formula (V):

(VI)

Those powder coatings are preferred which contain the diglycidyl hexahydroterephthalate, triglycidyl 1,2,4cyclohexanetricarboxylate (triglycidyl hexahydrotrimellitate), triglycidyl 1,3,5-cyclohexanetricarboxylate (triglycidyl hexahydrotrimesate) or polyglycidyl compounds of the above formula (III) or (IV).

The powder coating of this invention can of course also comprise mixtures of several aliphatic and/or cycioaliphatic polyglycidyl polycarboxylates. However, the novel powder coating compositions can additionally also contain other solid and/or liquid epoxy resin compounds, if their amount does not exceed 30% by weight of the total amount of epoxy resins in said powder coating composition. This applies in particular also to those epoxy resin compounds which are disclosed in EP-A-0 506 617 and in EP-A-0 536 085, both descriptions of which are regarded as a component of this description, and which are mentioned there as hardeners for powder coatings based on acid polyesters and containing aromatic groups and, in particular, as hardeners for the polyglycidyl esters described therein which contain aromatic groups in the molecule, for example for aromatic polyglycidyl polycarboxylates, such as diglycidyl phthalate, diglycidyl isophthalate or diglycidyl terephthalate, or for triglycidyl trimesate or triglycidyl trimellitate.

However, a particularly advantageous embodiment of the powder coatings of this invention are those compositions wherein the epoxy resins are exclusively glycidyl esters which are selected from the group consisting of aliphatic and cycloaliphatic polyglycidyl polycarboxylates. Epoxy resins which are liquid at room temperature (10 to 25° C.) are preferably used in the form of solid mixed phases (solid solutions) that are formed from the liquid epoxy resins which are solid at room temperature, such as described in EP-A-0 536 085.

The powder coating compositions of this invention preferably contain the epoxy resins in such an amount that the ratio of the carboxyl groups of the poly(meth)acrylic resins to the epoxy resin groups is from 0.5:1 to 2:1.

The powder coatings of this invention can additionally also contain further modifiers conventionally used in the coating industry, typically light stabilisers, curing accelerators, dyes, pigments, e.g. titanium dioxide pigment, deaerators, e.g. benzoin, and/or flow control agents. Suitable flow control agents are typically polyvinyl acetals, such as polyvinyl butyral, polyethylene glycol, polyvinyl pyrrolidone, glycerol, acrylic copolymers such as those available under the trademarks Modaflow® or Acrylron®. As EP-A-0 462 053 discloses, the powder coatings of this invention may also contain solid colloidal condensation polymers consisting of urea or melamine and formaldehyde if the above-mentioned formation of solid solutions should not be utilised for the solidification of liquid epoxy resins.

Powder coatings of this invention can be prepared by simple mixing of the components, conveniently in a ball mill. Another possibility, which is more preferred, comprises fusing, mixing and homogenising the components together, preferably in an extruder such as a Buss Ko-kneader, cooling the product and comminuting it. The powder coating compositions preferably have a particle size in the range from 0.015 to 500 μm, more preferably from 10 to 75 μm. In some cases it may also be expedient to first prepare a masterbatch from part of the binder, the epoxy resins and, optionally, further components, and then mixing and homogenising it in a second step with the remaining binder and the remaining components to give the final powder coating composition.

After application to the object to be coated, the powder coatings are hardened at a temperature of no less than about 100° C., preferably in the range from 120 to 140° C. Normally about 5 to 60 minutes are required for hardening. Materials suitable for coating are all those which are stable at the temperatures necessary for the cure, in particular ceramic materials and metals. The substrate can already have one or more than one coat of base lacquer which is compatible with the powder coating.

A preferred field of application for compositions of this invention are automotive lacquers which are coated as topmost layer on one or more than one coat of base lacquer which is applied to the automobile first. Accordingly, the invention also relates to the use of the above-described powder coating compositions as automotive lacquer.

EXAMPLE

A mixture of monomers having the following composition:

| | |
|---|---|
| methacrylic acid (MAA) | 15 g |
| styrene (St) | 15 g |
| methyl methacrylate (MMA) | 30 g |
| butyl methacrylate (BuMA) | 40 g |
| dicumyl peroxide (initiator) | 1.5 g |
| thioglycolic acid (chain-transfer agent) | 1.75 g | is given to a reactor charge consisting of:

| | |
|---|---|
| toluene | 30 milliliters |
| dicumyl peroxide (initiator) | 1.5 g |
| thioglycolic acid (chain-transfer agent) | 1.75 g | as described in more detail in EP-A-0 697 440, Example 1. Further processing as described in said example results in the formation of methacrylic resin A.

The powder coating compositions (amounts given in grams) cited in the Table below are homogenised in an extruder (laboratory extruder, supplied by PRISM, The Old Stables, England) in the temperature range from 60 to 80° C. The cooled extrudates are ground to the ready powder coating having a particle size of about 40 μm. The powder coating compositions are sprayed electrostatically on an aluminium sheet precoated with a silver metallic base lacquer (VWL 97A BASF), the coat of base lacquer being 40 μm. The coat of powder coating has a thickness as shown in the Table. Important properties of said coatings are also shown in the following Table.

TABLE

| Powder coating No. | 1 | 2 | 3 |
|---|---|---|---|
| methacrylic resin A | — | — | 74.81 |
| Joncryl SCX 819 (1) | 87 | 87 | — |
| TGIC (2) | 13 | — | — |
| 1,2 CHDA DGE (3a) | — | 13 | — |
| HHTMLA TGE (3b) | — | — | 20.79 |
| benzoin | 0.3 | 0.3 | 0.29 |
| Modaflow M 2000 (4) | 0.3 | 0.3 | 0.29 |
| Tinuvin 144 (5) | 1.4 | 1.4 | 1.31 |
| Tinuvin 900 (6) | 2.6 | 2.6 | 2.51 |
| extrusion conditions | PRISM Extruder 250 rpm | | |
| | 60–80° C. | | 70° C. |
| gelling time 140° C. (s) | 250 | 570 | 248 |
| stoving conditions | 30 min/140° C. | | |
| Thickness of powd. coat. | 60 μm | 60 μm | 45 μm |
| gloss (20°) | 80 | 80 | 47 |
| gloss (60°) | 100 | 100 | 91 |
| flow (visual) (7) | 1 | 7 | 6 |
| flow LW (8) | 61.5 | 42.3 | 35 |
| flow SN (9) | 153.7 | 92 | 93 |
| Tg ° C. powder (10) | 37 | 32 | 32 |
| Tg ° C. hardened syst. | 46 | 55 | 55 |

(1) carboxyl functional acrylate resin, supplied by SC Johnson Wax; acid number: 75 mg of KOH/g substance; ICI melt viscosity: 6000 MPas at 200° C.; molecular weight (medium weight $M_w$): 17000
(2) triglycidyl isocyanurate
(3a) diglycidyl hexahydrophthalate (Araldit PY 284)
(3b) hexahydrotrimellitic acid triglycidylester
(4) flow control agent based on a butylated polyacrylate
(5) HALS (polyalkylpiperidine compound)
(6) UV absorber
(7) empirical scale from 0 (poor) to 10 (very good) flow determination using the "Wave Scan" profilometer (supplied by Byk)
(8) parameter "Long Wave": from >60 (poor) to <30 (very good)
(9) parameter "Subnote": from >150 (poor) to <50 (very good)
(10) The Tg values of this Table were determined by DSC (heating rate: 10° C./min).

This Table shows in particular that the flow behaviour of the novel powder coatings No. 2 and No. 3 is substantially better than that of a powder coating which uses the same binder but the customary powder coating hardener triglycidyl isocyanurate (powder coating 1).

What is claimed is:

1. An improved powder coating composition suitable for use in automotive lacquer, which is free of carboxyl-functional polyesters, comprising a binder consisting of one or more than one poly(meth)acrylic resin having free carboxyl groups and, as hardener for the poly(meth)acrylic resin, one or more than one epoxy resin having a molecular weight of up to 1500, wherein the epoxy resin is a cycdoaliphatic polyglycidyl polycarboxylate or mixtures thereof, the cycioaliphatic polyglycidyl polycarboxylate being selected from the group consisting of diglycidyl hexahydrophthalate, diglycidyl hexahydroterephthalate, triglycidyl 1,2,4-cyclohexanetricarboxylate and triglycidyl 1,3,5-cyclohexanetricarboxylate, wherein the coating composition flows and cures at temperatures in the range of about 100° C. to about 150° C. to a smooth form.

2. A powder coating composition according to claim 1, wherein the Tg value of the poly(meth)acrylic resin having free carboxyl groups, determined by DSC (heating rate 10° C. per minute), is 40 to 75° C.

3. A powder coating composition according to claim 1, wherein the acid number of the poly(meth)acrylic resin having free carboxyl groups is 30 to 160.

4. A powder coating composition according to claim 1, wherein the cycloaliphatic polyglycidyl polycarboxylate is selected from triglycidyl hexahydrohemimellitate, triglycidyl hexahydrotrimesate and triglycidyl hexahydrotrimellitate.

5. An automotive lacquer according to claim 1.

* * * * *